United States Patent Office 3,542,748
Patented Nov. 24, 1970

3,542,748
ANTISTATIC AGENTS FOR PLASTIC COMPOSITIONS
Frank Joseph Arthen, Somerset, N.J., assignor to American Cyanamid Company, Stamford, Conn., a corporation of Maine
No Drawing. Filed Feb. 10, 1966, Ser. No. 526,396
Int. Cl. C08d 3/04
U.S. Cl. 260—80.7                                      7 Claims

ABSTRACT OF THE DISCLOSURE

A new composition having improved antistatic properties comprising a polymeric plastic material (e.g., a polyolefin) and an antistatic agent represented by the following formula:

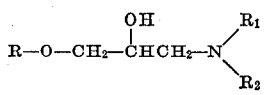

wherein R is an alkyl radical of 8 to 18 carbon atoms, $R_1$ is $CH_2$—$CHR_3(OCH_2CHR_3)_nOH$ wherein $n$ is 0–9, $R_2$ is hydrogen, lower alkyl or $R_1$, and each $R_3$ is individually hydrogen or lower alkyl.

---

This invention relates to a method for imparting antistatic properties to polymeric compositions and, more particularly, to a method for the minimization of accumulated static electricity in polymers such as homopolymers and copolymers of ethylene, propylene, vinylchloride, styrene, etc. The method involves incorporating in the polymer a compound represented by the following Formula I:

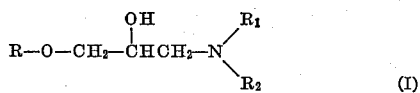    (I)

wherein R is an alkyl radical of 8 to 18 carbon atoms, $R_1$, is $CH_2$—$CHR_3(OCH_2CHR_3)_nOH$ wherein $n$ is 0–9, $R_2$ is hydrogen, lower alkyl or $R_1$, and each $R_3$ is individually hydrogen or lower alkyl (e.g., methyl). It relates further to the polymeric compositions resulting from this method.

Polymeric plastic compositions typified by polyolefins (e.g., homopolymers and copolymers of ethylene, propylene and butylene, poly(vinyl chloride), polystyrene, styrene-butadiene copolymers and terpolymers of acrylonitrile, butadiene and styrene( (ABS), tend to accumulate surface electric charges during fabrication, and, subsequently, during the life of the material. This is highly objectionable for a number of reasons. Charged bodies attract dust, and, depending upon conditions, may also give other troublesome effects such as shock to the person contacting the charged material, radio interference, etc.

Various means have been proposed to overcome or minimize the accumulation of surface electric charges including surface application of various types of antistatic materials, e.g., quaternary ammonium salts. However, surface treatment is often of only temporary assistance. Application of a coating composition containing an antistatic agent, has also been proposed, but the coating processes are costly and the effect is not permanent.

It has also been proposed to incorporate the antistatic agent into the plastic composition during either compounding, molding or fabrication steps. For practical purposes, an antistatic agent incorporated directly into the plastic, must fulfill certain requirements. To begin with, the agent must have sufficient antistatic activity when applied at feasible concentrations. Thus, the agent should be effective at low concentrations for reasons of economy and to avoid impairing the properties of the polymeric substrates. The material must be compatible with the plastic composition and must be of such a nature that it can be easily incorporated during the conventional compounding and milling steps. The antistatic properties of the agent should be substantially permanent and should outlast exposure to high temperatures. Heat stability is especially important for use in polypropylene which must be heated to high temperatures to enable proper compounding, milling and molding thereof.

Materials have previously met certain of these requirements to varying degrees. However, there is still a definite need for a practical antistatic agent which is effective at low concentrations and has good heat stability so that its effect is not destroyed during the fabrication or compounding steps or through the life of the material.

The present invention is based on the discovery that alkoxyalkanolamines defined by Formula I meet the stated requirements for useful antistatic agents. Thus, members of this class are highly active at low concentrations. Whereas other agents in the past have been used at concentrations of from 1% to 5% (by weight), the new agents are effective even at concentrations of 0.1–1%, although in some instances they may be used at concentrations as low as 0.05% or as high as about 5%.

In addition, they meet very stringent requirements as to heat stability, being capable of withstanding high temperatures encountered either in processing or in use, or both. Yet, they may be prepared from easily available, low-priced starting materials.

The compounds used in this invention are known and may be prepared very conveniently by the conventional reaction of an alkyl 2,3-epoxypropyl ether with a suitable alkanolamine. In some cases, it may be economically desirable to react a mixture of two or more homologous epoxyethers, if such mixtures are commercially available. The resulting antistatic agent will be a homologous mixture of alkoxyalkanolamines (Formula I wherein $n=0$). Such agents may be employed without separation of the reaction product into its component homologs. Lower alkyleneoxide (e.g., ethylene and propylene oxide) adducts of the foregoing (i.e., compounds of Formula I wherein $n$ is greater than zero) are obtainable by treating the compound of Formula I wherein $n$ is zero, with the appropriate alkylene oxide (e.g., ethylene oxide). Typical preparations will be described in the following examples.

Several methods are available for evaluation of the compounds of the invention as antistatics. Molded or extruded formulations containing a known amount of the antistatic agents are prepared and these are then evaluated for heat stability, surface resistivity and presence and strength of surface static charge.

The invention is further illustrated by the following examples, in which parts are expressed on a weight basis.

EXAMPLE 1

N-(2-hydroxy-3-dodecyloxypropyl)ethanolamine—

Agent A

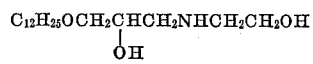

Into a suitable vessel are placed 242 parts (1.0 mol) of 2,3-epoxypropyl-n-dodecyl ether and 61 parts (1.0 mol)

of 2-aminoethanol. The mixture is heated on a steam bath for 2.5 hours. The product is then cooled and recrystallized from hexane. The product separates out as a white plate-like solid of melting point 59–60° C.

Additional compounds are prepared using a similar procedure but using other 2,3-epoxypropyl ethers and ethanolamines exemplified as follows:

N-(2-hydroxy-3-dodecyloxypropyl)diethanolamine—
Agent B

Prepared by the reaction of 2,3-epoxypropyl-n-dodecyl ether with diethanolamine, the product was obtained as a liquid of boiling point 213–218° C. at a pressure equivalent to 0.2 mm. of mercury.

N-(2-hydroxy-3-dodecyloxypropyl)-2-(2'-hydroxyethoxy)-ethylamine—Agent C

Prepared by the reaction of 2,3-epoxypropyl-n-dodecyl ether with 2-(2'-aminoethoxy)ethanol, the product was obtained as a liquid of boiling point 212–215° C. at a pressure equivalent to 0.3 mm. of mercury.

Ethylene oxide adducts of Agents A, B and C are prepared by respective reactions of A, B or C with six moles of ethylene oxide in the presence of sodium methoxide at a temperature of about 125° C. and a pressure of 25 p.s.i.g.

EXAMPLE 2

Samples were prepared by blending and milling the additives of this invention into various polymers, followed by compression-molding. The antistatic agents used are as follows:

Agent A—N-(2-hydroxy-3-dodecyloxypropyl)ethanolamine

Agent B—N-(2-hydroxy-3-dodecyloxypropyl)diethanol amine

Agent C—N-(2-hydroxy-3-dodecyloxypropyl)-2-(2'-hydroxyethoxy)ethylamine

Agent D—N-(2-hydroxy-3-octyloxypropyl)ethanolamine

Agent E—N-(2-hydroxy-3-octyloxypropyl)-2-(2'-hydroxyethoxy)ethylamine

Agent X—Commercial type, ethylene oxide adduct of a long chain alcohol.

Evaluation procedures and results

Compounds were evaluated as antistatic agents for various polymers by the test methods described below: The test samples were conditioned for twenty-four hours at 50% relative humidity. Antistatic activity is then determined by:

(1) Surface resistivity measurement.

(2) Cigarette ash test in which the sample is rubbed twenty times with a wool cloth and the distance (in inches) over which the film shows an attraction for cigarette ashes, is measured. No ash pick-up down to one inch indicates good antistatic properties.

(3) Electrostatic locator test in which the sample is rubbed twenty times with a wool cloth and placed one inch from the probe of the instrument. The instrument measures the magnitude of charge on the surface of the plastic. Lower values indicate good antistatic properties.

Results of the tests are shown in the following table.

TABLE I.—ANTISTATIC PROPERTIES OF VARIOUS MOLDED FILMS

| Number | Polymer | Antistatic agent, percent | Surface resistivity (megohms) | Ash test (inches) | Electrostatic locator |
|---|---|---|---|---|---|
| 1 | Polyethylene (high density) | None | $50 \times 10^7$ | 5.0 | 500 |
| | | Agent A (0.5) | $15 \times 10^3$ | 0.25 | 75 |
| | | Agent B (2.0) | $90 \times 10^2$ | 0.5 | 250 |
| | | Agent C (2.0) | $35 \times 10^2$ | 0 | 100 |
| | | Agent D (0.5) | $60 \times 10^2$ | 0 | 0 |
| | | Agent E (0.5) | $65 \times 10^2$ | 0.25 | 5 |
| | | Agent X (0.5) | $25 \times 10^6$ | 3.0 | 300 |
| 2 | Polyethylene (low density) | None | $15 \times 10^7$ | 3.0 | 600 |
| | | Agent A (0.3) | $22 \times 10^3$ | 0.5 | 25 |
| | | Agent B (0.5) | $25 \times 10^3$ | 0 | 0 |
| 3 | Polypropylene | None | $50 \times 10^7$ | 4.5 | 600 |
| | | Agent A (2.0) | $30 \times 10^3$ | 0 | 0 |
| | | Agent C (2.0) | $21 \times 10^4$ | 1.0 | 50 |
| | | Agent X (2.0) | $50 \times 10^5$ | 2.0 | 400 |
| 4 | Polystyrene | None | $15 \times 10^7$ | 4.0 | 700 |
| | | Agent A (1.5) | $25 \times 10^3$ | 0.5 | 50 |
| | | Agent B (2.0) | $30 \times 10^3$ | 0.5 | 60 |
| 5 | Polystyrene-butadiene copolymer | None | $20 \times 10^7$ | 0.4 | 350 |
| | | Agent A (2.0) | $14 \times 10^4$ | 0.25 | 25 |
| 6 | ABS | None | | 2.0 | 500 |
| | | Agent C (2.0) | $55 \times 10^4$ | 0.75 | 100 |
| 7 | PVC (rigid) | None | $50 \times 10^7$ | | |
| | | Agent B (3.0) | $11 \times 10^3$ | | |
| | | Agent C (2.0) | $11 \times 10^4$ | | |

EXAMPLE 3

Additives were incorporated into certain polymers using the mill. The milled material was granulated and extruded at 350–500° F. in the case of low density polyethylene and at 400–550° F. for high density polyethylene and polypropylene. In the case of high density polyethylene, 0.5% titanium dioxide was added to the polymer during compounding to determine its effect on antistatic properties.

During the extrusion process, which is accompanied by moderate to heavy fuming, no build-up of compounds of the present invention on the take-up rolls was observed, as is the case with many antistatic agents of the past.

Antistatic properties were determined as before and results are given in Table II which follows.

TABLE II.—ANTISTATIC PROPERTIES OF EXTRUDED FILMS
[$TiO_2$ Pigmented Polymers (0.5% Conc.)]

| Number: | Polymer type | Antistatic agent | Conc., percent | Antistatic tests | | |
|---|---|---|---|---|---|---|
| | | | | Surface resistivity | Ash test (inches) | Electrostatic locator |
| 1 | Polyethylene (low density) | None | | $50 \times 10^6$ | 6 | 850 |
| | | Agent A | 0.25 | $15 \times 10^2$ | 0 | 50 |
| | | Agent B | 0.25 | $25 \times 10^2$ | 0 | 150 |
| | | Agent X | 0.50 | $12 \times 10^4$ | 0 | 0 |
| 2 | Polyethylene (high density) | None | | $30 \times 10^6$ | 6 | 750 |
| | | Agent A | 0.3 | $15 \times 10^2$ | 0 | 20 |
| | | Agent B | 0.3 | $20 \times 10^2$ | 0 | 20 |
| | | Agent C | 0.3 | $16 \times 10^2$ | 0 | 15 |
| | | Agent X | 0.5 | $19 \times 10^4$ | 3 | 400 |
| 3 | Polypropylene | None | | $50 \times 10^{17}$ | | |
| | | Agent A | 0.75 | $30 \times 10^2$ | 0 | 0 |
| | | Agent C | 0.75 | $20 \times 10^3$ | 0 | 0 |
| | | Agent X | 0.75 | | 8 | 700 |

These results show that the compounds of the present invention are effective as antistatic agents under extrusion conditions, are heat stable, are not impaired in activity by the presence of $TiO_2$ and are more effective than a commercial type of antistatic agent.

EXAMPLE 4

Heat stability tests

N-2-hydroxy-3-dodecyloxypropyl)ethanolamine was subjected to Differential Thermal Analysis as well as to Thermo-Gravimetric Analysis. Results of the former test indicated this compound to be heat stable up to 300° C. the latter test indicated that volatilization of the compound to the extent of 10% of original amount present occurred as the temperature was gradually increased to 261° C. This latter result coupled with the former indicated that the compound volatilized without decomposition over the temperature range studied.

Additionally, a sample of high density polyethylene containing 0.5% of this additive was found to exhibit excellent heat stability over a period of thirty minutes at 250° C. in a Melt Indexer. Discoloration was negligible.

I claim:

1. A composition comprising a polymeric material and as an antistatic agent therefor, a compound of the formula:

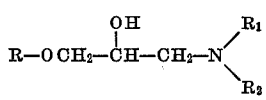

wherein R is an alkyl radical of 8–18 carbons; $R_1$ is $CH_2$—$CHR_3(OCH_2CHR_3)_nOH$ wherein $n$ is 0–9; $R_2$ is hydrogen, lower alkyl or $R_1$; and each $R_3$ is individually either hydrogen or lower alkyl; said agent being present in a concentration of 0.05 to 5.0% based on the weight of the polymeric material.

2. The composition of claim 1 wherein the antistatic agent is N-(2-hydroxy-3-dodecyloxypropyl)ethanolamine.

3. The composition of claim 1 wherein the polymeric material is a polymer of an olefin of 2–4 carbons, styrene or vinyl chloride.

4. The composition of claim 3 wherein the antistatic agent is N-(2-hydroxy-3-dodecyloxypropyl)ethanolamine.

5. The composition of claim 1 wherein the polymeric material is rigid poly(vinyl chloride) and the agent is N-(2-hydroxy-3-dodecyloxypropyl)diethanolamine.

6. The composition of claim 1 wherein the polymeric material is acrylonitrile-butadiene-styrene terpolymer and the agent is N-(2-hydroxy-3-dodecyloxypropyl)-2-(2'-hydroxyethoxy)ethylamine.

7. The composition of claim 1 wherein the polymeric material is a member selected from the group consisting of polyolefins, poly(vinyl chloride), polystyrene, styrene-butadiene copolymers and terpolymers of acrylonitrile, butadiene and styrene.

References Cited

UNITED STATES PATENTS 3,365,435  1/1968  Adams _____ 260—93.7
3,332,912  7/1967  Rochlitz _____ 260—67

JOSEPH L. SCHOFER, Primary Examiner
R. S. BENJAMIN, Assistant Examiner

U.S. Cl. X.R.
260—80.78, 83.7, 91.7, 93.5, 93.7, 94.9